United States Patent [19]
Kasday

[11] Patent Number: 6,108,629
[45] Date of Patent: Aug. 22, 2000

[54] METHOD AND APPARATUS FOR VOICE INTERACTION OVER A NETWORK USING AN INFORMATION FLOW CONTROLLER

[75] Inventor: Leonard Ralph Kasday, Moorestown, N.J.

[73] Assignee: AT&T Corp., New York, N.Y.

[21] Appl. No.: 08/845,732

[22] Filed: Apr. 25, 1997

[51] Int. Cl.⁷ .................................................. G10L 13/00
[52] U.S. Cl. .......................................... 704/258; 704/270
[58] Field of Search .................................. 704/258, 270, 704/275, 272, 276

[56] References Cited

U.S. PATENT DOCUMENTS 5,729,659  3/1998  Potter ....................................... 704/275
5,752,232  5/1998  Basore et al. ............................ 704/275

OTHER PUBLICATIONS

Hypertext '91 Proceedings, Arons, Hyperspeech: Navigation in speech only Hypermedia, pp133–146, Dec. 1991.

IEEE Expert. Flmmia, "Almost there: A new medium on the Web". pp 85–86, Jun. 1996.

ICLSP 94, Yokohama. Bekley et al., "A multimodal Teleconferncing System using Hands–Free voice control". pp 555–8, Sep. 1994.

Internet, World Wide Web, The Productivity Works, Inc., Copyright 1996, 1997 (info@prodworks.com), pwWebSpeak; ProdWorks Home Page.

Primary Examiner—Richemond Dorvil

[57] ABSTRACT

A method and apparatus for controlling the quantity of information audibly presented to a user by a voice interaction system. The information is received from a document server. The received information is converted into an audio information format. A predetermined portion of the converted information is read to a user. Inputs from the user are monitored for modifying the portion of converted information read to the user.

17 Claims, 3 Drawing Sheets

METHOD AND APPARATUS FOR VOICE INTERACTION OVER A NETWORK USING AN INFORMATION FLOW CONTROLLER

FIELD OF INVENTION

The present invention is directed to voice interaction over a network. More particularly, the present invention is directed to voice interaction over a network utilizing an information flow controller.

BACKGROUND OF THE INVENTION

The amount of information available over communication networks is large and growing at a fast rate. The most popular of such networks is the Internet, which is a network of linked computers around the world. Much of the popularity of the Internet may be attributed to the World Wide Web (WWW) portion of the Internet. The WWW is a portion of the Internet in which information is typically passed between server computers and client computers using the Hypertext Transfer Protocol (HTTP). A server stores information and serves (i.e. sends) the information to a client in response to a request from the client. The clients execute computer software programs, often called browsers, which aid in the requesting and displaying of information. Examples of WWW browsers are Netscape Navigator, available from Netscape Communications, Inc., and the Internet Explorer, available from Microsoft Corp.

Servers, and the information stored therein, are identified through Uniform Resource Locators (URL). URL's are described in detail in Berners-Lee, T., et al., *Uniform Resource Locators*, RFC 1738, Network Working Group, 1994, which is incorporated herein by reference. For example, the URL http://www.hostname.com/document1.html identifies the document "document1.html" at host server "www.hostname.com". Thus, a request for information from a host server by a client generally includes a URL. The information passed from a server to a client is generally called a document. Such documents are generally defined in terms of a document language, such as Hypertext Markup Language (HTML). Upon request from a client, a server sends an HTML document to the client. HTML documents contain information that is interpreted by the browser so that a representation can be shown to a user at a computer display screen. An HTML document may contain information such as text, logical structure commands, hypertext links, and user input commands. If the user selects (for example by a mouse click) a hypertext link from the display, the browser might request another document from a server, move the user to another part of the same document, display an image, activate an animation sequence, and so forth.

Currently, most WWW browsers are based upon textual and graphical user interfaces. Thus, documents are presented as images on a computer screen. Such images include, for example, text, graphics, hypertext links, and user input dialog boxes. Most user interaction with the WWW is through a graphical user interface. Although audio data is capable of being received and played back at a user computer (e.g. a .wav or .au file), such receipt of audio data is secondary to the graphical interface of the WWW. Thus, with most WWW browsers, audio data may be sent as a result of a user request, but there is no means for a user to interact with the WWW using an audio interface.

Recently, audio browsing systems have been developed that allow a user to access documents on a server computer using only an audio interface device (e.g. a telephone), rather than the traditional paradigm of a client computer executing a browser program. The server computer can be one of the plurality of servers that comprise the Internet.

One such audio browsing system is disclosed in the document entitled The pwWebSpeak™ Project which can be accessed on the Internet using the following URL: http://www.prodworks.com/pwwebspk.html, and is incorporated herein by reference.

One problem associated with existing audible web browsers, however, is the inability to provide a user interface capable of presenting the vast amounts of information found in many HTML documents in an efficient and user-friendly manner. Conceptually, the content of an HTML document is a tree structure. The document contains elements such as sections, lists, tables, buttons, and so forth. Each element, in turn, may contain other elements. For example, sections can contain lists, and a list item may itself be another list.

Many traditional voice interactive systems navigate through the tree structure of an HTML document using a menu system. This menu system, however, is less than satisfactory for a number of reasons. For example, navigation through trees purely by menus is a tedious process. The user has to often keep going up one level to pick the next menu item. In the case of a relatively large tree, a user can quickly become "lost" within the menu choices. Moreover, HTML documents frequently have no headings for some group of elements, such as list items. In other words, the page content does not directly specify a name or description for the menu from which the element would be chosen. In addition, the HTML descriptions of the document often do not define the tree structure explicitly. For example, even though HTML defines the beginning of a section with a heading tag, there is no tag to define the end of a section. In fact, many authors do not even use the heading tag, but rather rely upon visual demarcations to organize the information for a user, such as a bold font or a horizontal line.

Other voice interaction systems mimic techniques traditionally used by graphic based browsers for navigating through a document, such as text sliders for scrolling through a document, cursor movement, and instructions such as page up, page down, home, and end. These traditional navigation techniques allow the user to visually scan the various text, images, hyperlinks, and so forth, at a relatively fast rate. Similarly; some voice interaction systems provide a means for scrolling through a document by allowing the user to "tab" or manually skip through the various header levels within a document.

For example, the following table includes a list of audio browsing commands typically offered by an audio browsing system. Users may navigate through documents using audio user input, either in the form of dual-tone multi-frequency (DTMF) 15 tones or speech, as follows.

| DTMF COMMAND | SPEECH COMMAND | NAVIGATION RESPONSE |
| --- | --- | --- |
| *8 | Top | Jump to beginning of document |
| *3 | End | Jump to end of document |
| *6 | Next | Jump to beginning of next prompt sequence |
| *7 | Skip | Jump to |

-continued

| DTMF COMMAND | SPEECH COMMAND | NAVIGATION RESPONSE |
|---|---|---|
| *5 | List | next option, link, definition or other list item<br>List all links within a document with a pause following each link allowing user to specify a selection of the link. |

As can be seen, these commands permit a user to skip through a document. These commands, however, do not provide a means for controlling the quantity of information read to the user by the voice interaction system. Thus, the user is left to essentially guess whether the document contains any desired information based on the short, and frequently inadequate, descriptions provided by the headers. This often results in the user having to scan through large amounts of irrelevant information, which is inconvenient and also increases connection charges for the user, as well as potentially delaying another user from accessing the system.

Based on the foregoing, it can be appreciated that there is a need for an audio browser system in which the quantity of information presented to the user in an audible format can be readily controlled in an efficient and user-friendly manner.

SUMMARY OF THE INVENTION

These and other needs are substantially met through a method and apparatus for controlling the quantity of information audibly presented to a user by a voice interaction system. The information is received from a document server. The received information is converted into an audio information format. A predetermined portion of the converted information is read to a user. Inputs from the user are monitored for modifying the portion of converted information read to the user.

With these and other objects, advantages and features of the invention that will become hereinafter apparent, the nature of the invention may be more clearly understood by reference to the following detailed description of the invention, the appended claims and to the several drawings attached herein.

DETAILED DESCRIPTION

In accordance with the present invention, an audio browsing system is described that permits a user to control the quantity of information audibly presented to a user by the system. One example of an audio browsing system suitable for practicing the present invention includes the audio browsing system disclosed in U.S. patent application Ser. No. 08/635,801, assigned to AT&T Corp. and entitled Method and Apparatus for Information Retrieval Using Audio Interface, filed on Apr. 22, 1996, incorporated herein by reference (hereinafter referred to as the "AT&T audio browser patent"). The disclosed audio browsing system allows a user to access documents on a server computer connected to the Internet using an audio interface device.

Figure 1:
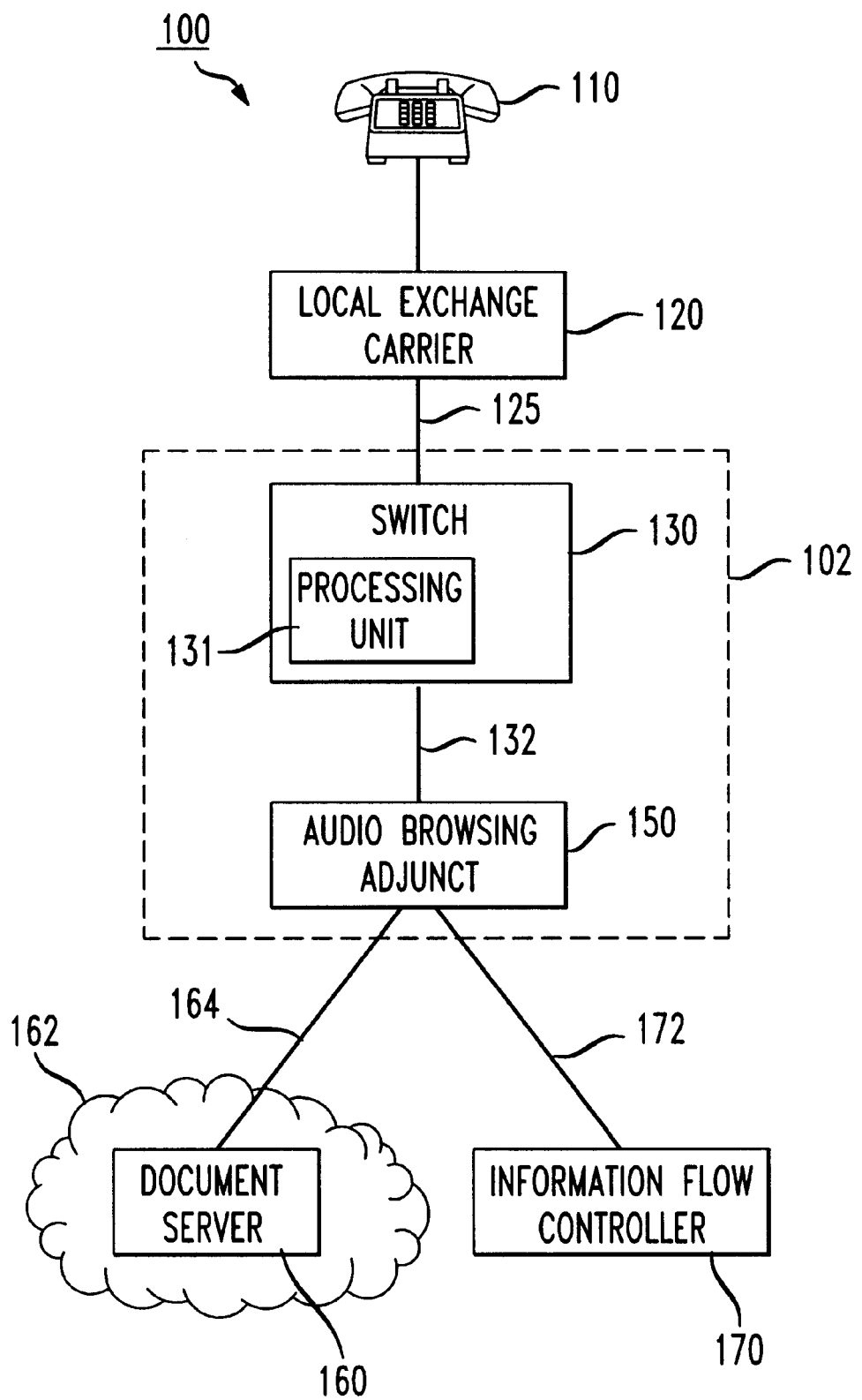
FIG. 1 shows a diagram of a telecommunications system which is suitable to practice one embodiment of the present invention.

Referring now in detail to the drawings wherein like parts are designated by like reference numerals throughout, there is illustrated in FIG. 1 a diagram of a telecommunications system 100 which is suitable to practice one embodiment of the present invention. An audio interface device, such as telephone 110, is connected to a local exchange carrier (LEC) 120. Audio interface devices other than a telephone may also be used. For example, the audio interface device could be a multimedia computer having telephony capabilities. A user of telephone 110 places a telephone call to a telephone number associated with information provided by a document server, such as document server 160.

In the embodiment shown in FIG. 1, the document server 160 is part of communication network 162. In an advantageous embodiment, network 162 is the Internet. Telephone numbers associated with information accessible through a document server, such as document server 160, are set up so that they are routed to special telecommunication network nodes, such as an audio browsing adjunct 150. An information flow controller 170 is coupled to audio browsing adjunct 150 and is used to format an HTML document into an audio information format described in more detail below.

In the embodiment shown in FIG. 1, audio browsing adjunct 150 is a node in telecommunications network 102 which is a long distance telephone network. Thus, the call is routed to the LEC 120, which further routes the call to a long distance carrier switch 130 via trunk 125. Long distance network 102 would generally have other switches similar to switch 130 for routing calls. However, only one switch is shown in FIG. 1 for clarity. It is noted that switch 130 in the telecommunications network 102 is an "intelligent" switch, in that it contains (or is connected to) a processing unit 131 which may be programmed to carry out various functions. Such use of processing units in telecommunications network switches, and the programming thereof, is well known in the art.

Upon receipt of the call at switch 130, the call is then routed to the audio browsing adjunct 150. Thus, there is established an audio channel between telephone 110 and audio browsing adjunct 150. The routing of calls through a telecommunications network is well known in the art and will not be described further herein.

Upon receipt of the call from telephone 110, the audio browsing adjunct 150 establishes a communication channel with the document server 160 associated with the called telephone number via link 164. In a WWW embodiment, link 164 is a socket connection over TCP/IP, the establishment of which is well known in the art. For additional information on TCP/IP, see Comer, Douglas, Internetworking with TCP/IP: Principles, Protocols, and Architecture, Englewood Cliffs, N.J., Prentice Hall, 1988, which is incorporated by reference herein. Audio browsing adjunct 150 and the document server 160 communicate with each other using a document serving protocol. As used herein, a document serving protocol is a communication protocol for the transfer of information between a client and a server. In accordance with such a protocol, a client requests information from a server by sending a request to the server and the server responds to the request by sending a document containing the requested information to the server. Thus, a document serving protocol channel is established between the audio browsing adjunct 150 and the document server 160 via link 164. In an advantageous WWW embodiment, the document serving protocol is the Hypertext Transfer Protocol (HTTP). This protocol is well known in the art of WWW communication and is described in detail in Berners-Lee, T. and Connolly, D., *Hypertext Transfer Protocol (HTTP) Working Draft of the Internet Engineering Task Force,* 1993, which is incorporated herein by reference.

Audio browsing adjunct 150 communicates with the document server 160 using the HTTP protocol. Thus, as far as the document server 160 is concerned, it behaves as if it were communicating with any conventional WWW client executing a conventional graphical browser. Consequently, the document server 160 serves documents to the audio browsing adjunct 150 in response to requests it receives over link 164. A document, as used herein, is a collection of information. The document may be a static document in that the document is pre-defined at the server 160 and all requests for that document result in the same information being served. Alternatively, the document could be a dynamic document, whereby the information which is served in response to a request is dynamically generated at the time the request is made. Typically, dynamic documents are generated by scripts, which are programs executed by the server 160 in response to a request for information. For example, a URL may be associated with a script. When the server 160 receives a request including that URL, the server 160 will execute the script to generate a dynamic document, and will serve the dynamically generated document to the client which requested the information. Dynamic scripts are typically executed using the Common Gateway Interface (CGI). The use of scripts to dynamically generate documents is well known in the art.

When an HTML document is received by a client executing a conventional WWW browser, the browser interprets the HTML document into an image and displays the image upon a computer display screen. In accordance with the principles of the present invention, however, upon receipt of a document from document server 160, the audio browsing adjunct 150 converts the document into an audio information format using information flow controller 170. Audio browsing adjunct 150 then converts the document in the audio information format into audio data which is read to the user in a known manner, such as converting text and alt-text to speech. Further details of such conversion are described in the AT&T audio browser patent. The audio data is then sent to telephone 110 via switch 130 and LEC 120. Thus, in this manner, the user of telephone 110 can access information from document server 160 via an audio interface.

In addition, the user can send audio user input from the telephone 110 back to the audio browsing adjunct 150. This audio user input may be, for example, speech signals or DTMF tones. The audio browsing adjunct 150 converts the audio user input into user data or instructions which are appropriate for transmitting to the document server 160 via link 164 in accordance with the HTTP protocol in a known manner. Further details of such conversion are described in the AT&T audio browser patent. The user data or instructions are then sent to the document server 160 via the document serving protocol channel. Thus, user interaction with the document server is via an audio user interface.

Figure 2:
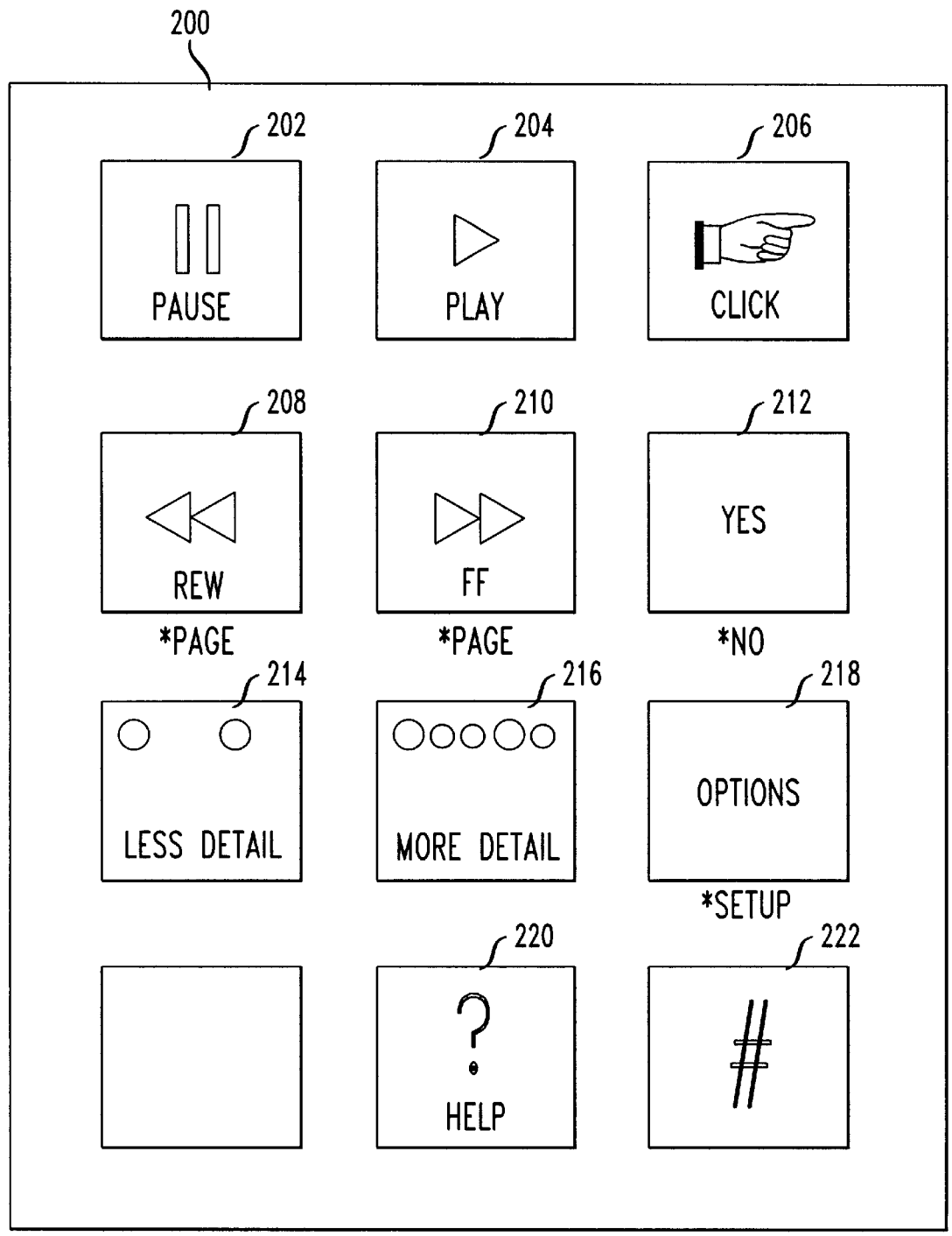
FIG. 2 shows a user interface suitable to practice one embodiment of the present invention.

FIG. 2 shows an audio user interface suitable to practice one embodiment of the present invention. FIG. 2 shows an audio user interface 200 comprising a traditional telephone keypad wherein individual keys are assigned unique functions. Although FIG. 2 shows a particular key assignment, it can be appreciated that any assignment order falls within the scope of the invention.

FIG. 2 shows various keys that might be found in traditional audible user interfaces. For example, a pause key 202 permits a user to pause the reading of a document. A play key 204 causes audio browsing adjunct 150 to audibly recite the contents of the document to the user in a normal fashion. A click key 206 is used similar to the left button located on a mouse to select an item from the document such as a hypertext link. A yes/no key 212 and options key 218 are used to indicate a yes or no response to a request, and select system options, respectively. A help key 220 and pound key 222 are also included in audible user interface 200.

Also found in audible user interface 200 are rewind key 208, fast forward key 210, less detail key 214, and more detail key 216. These keys comprise the keys which are used to control the quantity of information being read to the user.

In operation, fast forward key 210 causes audio browsing adjunct 150 to accelerate movement through a document. As key 210 is pressed, a series of sound snippets are recited to tell the user where they are in the document. For example, if the user is listening to music, the user will hear snippets of music accompanied by a time count (e.g., "[music snippet] . . . one minute [music snippet] . . . two minutes [music snippet . . . "). A user can press play button 204 at any point during the fast forward to hear the entire piece of music from the point when the play button 204 was pressed.

If the user is listening to a page of text, the user will hear a top level summary. The top level summary is generated by information flow controller 170 according to a default threshold value set for the less detail/more detail feature of controller 170 (described in more detail with reference to FIG. 3). The summary will also depend on how the person who authored the page designed it. An example of a top level summary is as follows:

"Smithville Sentinel, May twenty-first, nineteen ninety seven. Larchmont Lake dredging to start this summer [babble] More computers for Smithville High . . . Eighty Seven and still strutting [babble] Weather [babble] Index [babble] Bargains galore at Tony's Garden Store! End of page."

The [babble] reference is a babbling sound, similar to a tape player in Fast Forward, which indicates to the user that Audio browsing adjunct 150 is skipping through text. During the babble a user will also hear a "bing" every time a hypertext link is passed. This gives the user a quick estimate of how many links were passed in the babble portion of the document.

If the user wants to hear more of what is being babbled, the user selects play key 204 or more detail key 216. If play key 204 is pressed, the user will hear all the contents of the document beginning at the babble. If the more detail key 216 is pressed, the user will hear an increased amount of information within the babble.

For example, if the more detail key 216 is pressed in the babble following a headline, the user will hear the first sentence of all the paragraphs in the story, each followed by a babble to indicate that the rest of the paragraph is being skipped over. The play key 204 or more detail key 216 can be pressed again to read further inside the paragraph.

If the document contains a list, fast forward key 210 will cause audio browsing adjunct 150 to read the sentence just before the list, and the first couple of list entries. The user can then press play key 204 if the user wants to hear the rest of the list. If the list items are somewhat long (e.g., paragraphs or nested lists), the user could press more detail key 216 to keep on skipping through, but with finer detail.

Less detail key 214 operates opposite of more detail key 216, by causing audio browsing adjunct 150 to provide a shorter summary of the information contained within the HTML document. Thus, less detail key 214 permits the user to reduce the amount of information being read by audio browsing adjunct 150, thereby increasing the browsing speed of the user.

The operation of rewind key 208 depends on whether the user has initiated the play mode or fast forward mode. If the play mode has been initiated, rewind key 208 takes the user back to the last "bing," unless more than five seconds have passed, in which case rewind key 208 will take the user back to the beginning of the previous sentence, and pause. If the user presses rewind key 208 while in fast forward mode, the user will go to the beginning of the previous snippet, and pause.

If the user presses rewind key 208 while paused, audio browsing adjunct 150 acts in accordance with whether the user was last in fast forward or play mode. Thus, audio browsing adjunct 150 informs the user that it is going to take the user "back to last snippet" or "back to last bing" or "back to last sentence" before it actually does so.

Pressing fast forward key 210 while a user is listening to snippet or babble immediately moves the user to the next snippet.

Figure 3:
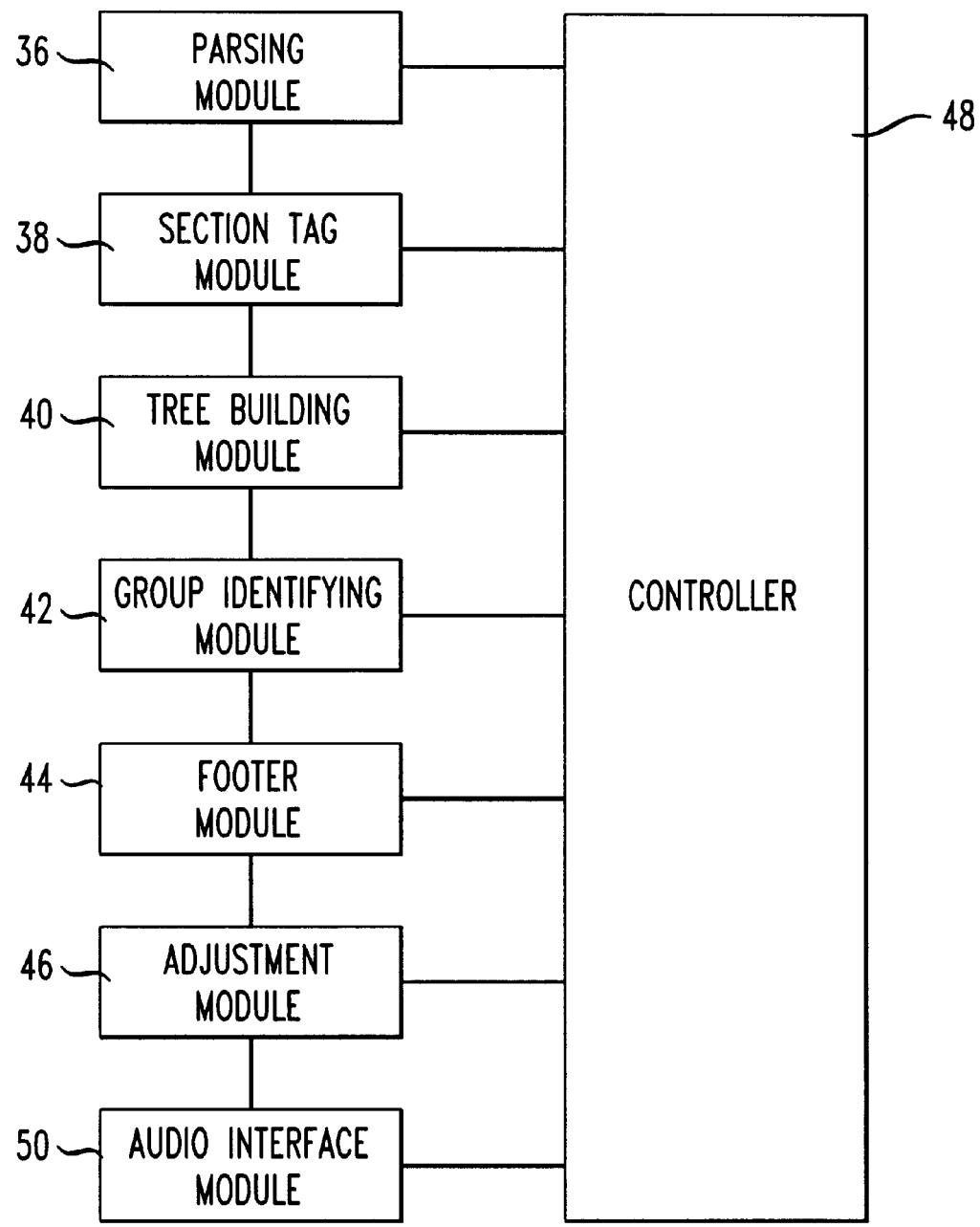
FIG. 3 is a block diagram of an information flow controller in accordance with one embodiment of the present invention.

FIG. 3 is a block diagram of an information flow controller in accordance with one embodiment of the present invention. FIG. 3 shows information flow controller 170, which comprises a parsing module 36, a section tag module 38, a tree depth calculation module 40, a group identifying module 42, a footer module 44, an adjustment module 46, and an audio interface controller 50, all connected to a controller 48. Information flow controller 170 is coupled to audio browsing adjunct 150 by line 172. It is worthy to note that although information flow controller 170 uses controller 48 in this embodiment of the invention, information flow controller may also use the controller or central processing unit (CPU) in audio browsing adjunct 150 with the appropriate connections which are well-known in the art, and still fall within the scope of the invention. Further, the functionality shown in information flow controller 170 could be incorporated in audio browsing adjunct 150 and still fall within the scope of the invention.

Parsing module 36 parses the information found in an HTML document into discrete elements. These elements can be stored in an array as an element list, wherein the array stores the element, and a "depth" and "adjustment" value for each element. The depth value reflects which level of the tree hierarchy the element is located, and is generated by tree depth calculation module 40. The adjustment value increases or decreases the depth value of an element depending upon the amount of useful contextual information, or other desirable factors, it provides to the user, and is generated by adjustment module 46.

Each element can be an HTML tag (i.e., text in the document bounded by a "<" and ">", or a word bounded by "white space", wherein white space is defined as a space, tab or newline character. Means to accomplish such parsing are well-known, and may be accomplished, for example, by the pattern matching and list creation operators in the Perl language, as described in detail in a book by Larry Wall and Randall L. Schwartz titled "Programming in Perl," O'Reilly and Associates, Inc., Sebastopol, Calif., 1992, which is incorporated by reference herein.

Section tag module 38 adds section control codes to the information. These section control codes identify where a section begins and ends within the information, thereby ensuring the tree depth is calculated accurately.

More particularly, HTML provides a means for specifying section titles. For example, top level headings might be represented by text between "<H1>" and "</H1>" tags, second level headings by text between "<H2>" and "</H2>", and so forth. HTML, however, does not explicitly specify the boundaries of the sections to which the headings refer. Therefore, section tag module 38 inserts "section" tags where appropriate.

Section tag module 38 indicates the beginning of a section using the following tag:

<SECTION LEVEL=n HEADING=headingText>, where n is the level of a section corresponding to the level of the heading from which it was produced, and headingText is the text between the tags of the heading from which it was produced. The end of a section is denoted by </SECTION>.

Section tag module 38 uses the following steps for inserting section tags within a document in accordance with one embodiment of the invention. These steps where designed to insure that although a section can contain lists and tables, or can be contained within a list or table, a section cannot start outside a list or table and end within it, or vice-versa.

1. Initialize CURRENT_DEPTH to zero.
2. Step through the element list until words are found between a <Hn> and a </Hn> tag (where n can be 1, 2, 3 . . . ), replace those tags and the text between them with the corresponding section tag.
3. Temporarily store as a variable the point "I" in the element list where this section tag was inserted, and the level "n" of the heading.
4. Step through the rest of the element list element by element. Whenever a list tag <UL>, <OL> or table tag <TABLE> is encountered, increment CURRENT_DEPTH by one. Whenever an end of list </UL>, </OL> or end of table </TABLE> tag is encountered decrement CURRENT_DEPTH by one.
5. Whenever a heading tag <Hm> is encountered where m is equal to or greater than n, insert </SECTION>, but only if CURRENT_DEPTH is zero (thus preventing sections from, e.g., starting outside a list and ending inside the list).
6. Go back in the list to point defined by I, and continue process at step b.
7. Continue until the end of the list is reached.

It is worthy to note that although section tags are inserted into an HTML document in the above-described manner, it can be appreciated that the method of inserting section tags can vary in accordance with the method used to parse the HTML document in a tree structure, and still remain within the scope of the invention. In this embodiment of the invention, the tree structure is parsed into a linear array of elements. Other techniques to parse an HTML document into a tree structure are well-known in the art, and the method of inserting section tags can vary to conform with the particular parsing method used.

Tree depth calculation module 40 computes tree depth values for each element in accordance with one embodiment of the invention. The depth values are generated using the following steps.

1. Initialize CURRENT_DEPTH to zero.
2. Step through the element list element by element, and calculate the CURRENT_DEPTH as follows:
   a. Whenever a list tag <UL>, <OL>, table tag <TABLE>, or <SECTION> tag is encountered, increment CURRENT_DEPTH by one. Whenever an end of list </UL>, </OL>, end of table tag </TABLE>, or end of section tag </SECTION> is encountered, decrement CURRENT_DEPTH by one.
   b. Set the depth of the element to the CURRENT_DEPTH.

Group identifying module 42 adds buttongroup control codes to the information. The buttongroup control codes identify where a group of buttons begins and ends within the information, thereby ensuring the tree depth is calculated accurately.

More particularly, web pages sometimes contain objects that are readily perceived as groups, even though there is nothing in the HTML to indicate that there is a group. The most common case is a group of "buttons". A "button" is a link containing a "small" amount of text or a "small" image. When audio browsing adjunct 150 encounters either of the following patterns, it will enclose the pattern with the tags <TEXTBUTTONGROUP> and </TEXTBUTTONGROUP>. An example of a text button pattern would be: "<A . . . > short_amount_of_text </A> punctuation . . . <A . . . > short_amount_of_text </A> punctuation," where <A . . . > is a link tag, a short amount of text would be N=20 or fewer characters not counting attribute tags (e.g., <B> for Bold>, and punctuation is any of the following: "|", "[", "]", "(", ")", and so forth. An example of an image pattern would be: "<A . . . > small_image </A> . . . <A . . . > small_image</A>," where small_image is any image less than 50 pixels high by 100 pixels wide. The above exemplary patterns could be detected using any traditional well-known technique.

Footer module 44 identifies where a footer begins and ends within the information, thereby ensuring the tree depth is calculated accurately. There is often material at the end of an HTML document that the user would like to have identified in the summary. This includes, e.g., navigation buttons (to go to the home page, next page, search page, and so forth), or contact information (e.g., address of the webmaster).

Since there is no standard HTML command to specify the "beginning of the footer," a heuristic model is used to identify the footer in an HTML document. In essence, the heuristic model described below searches for items that are too "large" to be part of a footer.

1. Go to end of the HTML document.
2. Step back an element at a time until one of the following is reached:
   a. A table that is not an IMAGEBUTTON GROUP (as defined above);
   b. A list;
   c. A sentence more than M=20 words long (this number could be adjustable) that does not contain any links;
   d. An image map larger than 50 pixels high by 100 pixels wide (these numbers could be adjustable)
   e. A form.
3. Insert <FOOTER> at the point just before one of the above is reached.

It can be appreciated that these rules for identifying a footer in an HTML document could be elaborated. For example, several additional properties of the elements could be searched, such as font size, justification, horizontal lines, and values could be assigned to each. The beginning of a footer could then be determined by looking at the point with the highest score.

In another example, a user could manually determine a footer. The user could go the end of a page, and step back through each line until the user judges that they are no longer in the footer.

Adjustment module 46 assigns an adjustment value to each discrete element stored in the element list. The adjustment factor is added to the depth value, thereby increasing or decreasing the threshold value at which the element would be read to a user over the telephone. Examples of the type of factors used to generate the adjustment value for an element follow. It is worthy to note that although the following list contains examples used in an advantageous embodiment, it can be appreciated that a wide range of factors can be used to generate adjustment values, all of which fall within the scope of the invention.

1. Adjustment value=minus one (−1) for the following elements:
   a. All words in the sentence preceding a list, since these words often describe the contents of the list. To find the sentence preceding the list, the words preceding a list are stepped through backwards until a period followed by a space is found, an end of list or table is found, or a heading is found.
   b. The first two buttons in a button group, since they often enable the user to induce the "theme" of the button group.
   c. The first ten words or a sentence (whichever comes first) of a paragraph (text following a <p>), since the first sentence often gives the theme of the paragraph.
2. Adjustment value=plus one (+1) for the "Areas" (or selectable region) in a client side image map.

Audio interface controller 50 interfaces with audio interface 200 to implement the features of information flow controller 170 made accessible to the user by audio interface 200. Audio interface controller 50 sets a threshold value for information flow controller 170 to a default reading value. The default reading value can reflect any initial level of detail a user would hear from audio browsing adjunct 150 when accessing the system. For example, an advantageous default value would be one (1), which would provide a high level reading of the HTML document, such as section headers, to the user. Thus, voice interactive network node would only read those elements for which the depth value plus adjustment value for those elements is equal to or less than the default value of one.

The threshold value can be modified by the user according to the level of detail the user desires. For example, a user wanting to hear a greater amount of detail from the HTML document, such as section headings and the first paragraph of the section, could press more detail button 216 which would increase the threshold value (e.g., from one to two). Similarly, if the user wanted to hear less detail, the user could press less detail button 214 to lower the threshold value. It is worthy to note that although it has been shown that the level of detail is increased when the default value is increased, and decreased when the default value is decreased, it can be appreciated that any technique to control whether an element is read falls within the scope of the invention.

It is also worthy to note that information flow controller 170 can be implemented in either hardware or software. If implemented in software, controller 48 is any standard microprocessor with sufficient processing power, such as the Intel Pentium™ family of processors, having access to sufficient memory to store the software code and for implementing the code.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for controlling a quantity of information audibly presented to a user, comprising the steps of:
   receiving the information;
   converting the information into an audio information format;
   reading a quantity of said converted information to a user;
   receiving a command to modify said quantity;
   modifying said quantity of said converted information read to said user in accordance with said command;
   wherein said information is converted using the steps of:
      parsing the information into elements;
      assigning each element a value;
      comparing said value with a threshold value; and
      determining whether each element should be read based upon said comparison.

2. The method of claim 1, wherein said command is to increase said quantity of said converted information read to the user by increasing said threshold value.

3. The method of claim 1, wherein said command is to decrease said quantity of said converted information read to the user by decreasing said threshold value.

4. The method of claim 3, wherein said assigning comprises:
   generating each value by taking a tree depth for an element; and
   decreasing said tree depth according to adjustment factors.

5. The method of claim 4, further comprising the step of adding section control codes to the information, wherein said section control codes identify where a section begins and ends within the information, thereby ensuring said tree depth is calculated accurately.

6. The method of claim 4, further comprising the step of adding buttongroup control codes to the information, wherein said buttongroup control codes identify where a group of buttons begins and ends within the information, thereby ensuring said tree depth is calculated accurately.

7. The method of claim 4, further comprising the step of adding footer control codes to the information, wherein said footer control codes identify where a footer begins and ends within the information, thereby ensuring said tree depth is calculated accurately.

8. The method of claim 4, wherein said reading comprises reading each element in a depth-first traversal order.

9. An apparatus for controlling a quantity of information audibly presented to a user, comprising:
   means for receiving the information;
   means for converting the information into an audio information format;
   means for reading a quantity of said converted information to a user;
   means for receiving a command to modify said quantity;
   means for modifying said quantity of said converted information read to said user in accordance with said command;
   wherein said conversion means comprises:
      means for parsing the information into elements;
      means for assigning each element a value;
      means for comparing said value with a threshold value; and
      means for determining whether each element should be read based upon said comparison.

10. The apparatus of claim 9, wherein said command is to increase said quantity of said converted information read to the user by increasing said threshold value.

11. The apparatus of claim 10, wherein said command is to decrease said quantity of said converted information read to the user by decreasing said threshold value.

12. The apparatus of claim 10, wherein said means for assigning comprises:
   means for generating each value by taking a tree depth for an element; and
   means for decreasing said tree depth according to adjustment factors.

13. The apparatus of claim 12, further comprising means for adding section control codes to the information, wherein said section control codes identify where a section begins and ends within the information, thereby ensuring said tree depth is calculated accurately.

14. The apparatus of claim 12, further comprising means of adding buttongroup control codes to the information, wherein said buttongroup control codes identify where a group of buttons begins and ends within the information, thereby ensuring said tree depth is calculated accurately.

15. The apparatus of claim 12, further comprising means of adding footer control codes to the information, wherein said footer control codes identify where a footer begins and ends within the information, thereby ensuring said tree depth is calculated accurately.

16. The apparatus of claim 12, wherein said means for reading reads each element in a depth-first traversal order.

17. An apparatus for controlling a quantity of information audibly presented to a user, comprising:
   an audio browsing adjunct to receive information;
   an information flow controller coupled to said audio browsing adjunct to receive information from said audio browsing adjunct, and to convert said information into an audio information format by parsing the information into elements, assigning each element a value, comparing said value with a threshold value, and determining whether each element should be read based upon said comparison;
   a speech synthesizer coupled to said information flow controller to read a quantity of said converted information to a user; and
   audio interface coupled to said information flow controller to modify said quantity of said converted information read to said user by said speech synthesizer.

* * * * *